United States Patent
Liu et al.

(10) Patent No.: US 10,101,446 B2
(45) Date of Patent: Oct. 16, 2018

(54) OBJECT DETECTION DEVICE AND OBJECT DETECTION METHOD

(71) Applicant: Panasonic Corporation, Osaka (JP)

(72) Inventors: Weijie Liu, Kanagawa (JP); Makoto Yasugi, Tokyo (JP); Yoichi Nakagawa, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 451 days.

(21) Appl. No.: 15/075,224

(22) Filed: Mar. 21, 2016

(65) Prior Publication Data

US 2017/0067991 A1 Mar. 9, 2017

(30) Foreign Application Priority Data

Sep. 9, 2015 (JP) .................................. 2015-061975
Sep. 9, 2015 (JP) .................................. 2015-177558

(51) Int. Cl.
| | | |
|---|---|---|
| G01S 13/58 | (2006.01) | |
| G01S 13/87 | (2006.01) | |
| G01S 13/42 | (2006.01) | |
| G01S 13/91 | (2006.01) | |
| G01S 13/06 | (2006.01) | |

(Continued)

(52) U.S. Cl.
CPC .............. *G01S 13/58* (2013.01); *G01S 13/42* (2013.01); *G01S 13/87* (2013.01); *G01S 13/91* (2013.01); *G01S 7/415* (2013.01); *G01S 13/06* (2013.01); *G01S 13/931* (2013.01)

(58) Field of Classification Search
CPC .......... G01S 13/02; G01S 13/06; G01S 13/42; G01S 13/426; G01S 13/58; G01S 13/87; G01S 13/89; G01S 13/91; G01S 13/931; G01S 7/41; G01S 7/415; G01S 13/878; G01S 7/003; G01S 17/87; G01S 17/89
See application file for complete search history.

(56) References Cited

U.S. PATENT DOCUMENTS

2009/0040094 A1* 2/2009 Harada .................... G01S 13/87
342/59
2013/0285848 A1* 10/2013 Grau Besoli ............. G01S 7/03
342/134

(Continued)

FOREIGN PATENT DOCUMENTS

JP 2014-055883 3/2014

*Primary Examiner* — Olumide Ajibade Akonai
(74) *Attorney, Agent, or Firm* — Seed IP Law Group LLP

(57) ABSTRACT

An object detection device includes first information generation circuitry second information generation circuitry, region calculation circuitry, measured value interpolation circuitry, and object determination circuitry. The measured value interpolation circuitry which, in operation, calculates a first interpolated measured value of the first target object region using the second measured value of the second target object region or calculates a second interpolated measured value of the second target object region using the first measured value of the first target object region. The object determination circuitry which, in operation, determines the target object using a combination of the first measured value and the first interpolated measured value or a combination of the second measured value and the second interpolated measured value.

13 Claims, 10 Drawing Sheets

(51) Int. Cl.
*G01S 7/41* (2006.01)
*G01S 13/93* (2006.01)

(56) References Cited

U.S. PATENT DOCUMENTS

2016/0187466 A1* 6/2016 Kim ................... G01S 7/4026
                                                342/59
2016/0187479 A1* 6/2016 Shibata ............... G01S 13/87
                                                342/59

* cited by examiner

OBJECT DETECTION DEVICE AND OBJECT DETECTION METHOD

BACKGROUND

1. Technical Field

The present disclosure relates to object detection devices and object detection methods and, in particular, to an object detection device and an object detection method employed in a roadway infrastructure system or a monitoring system, which can accurately detect the position and velocity of an object that is present in a facility such as a road, a station, an airport, a port, or a hall and an area therearound.

2. Description of the Related Art

In recent years, object detection devices have been employed in roadway infrastructure systems. Such an object detection device is installed in a road or an area therearound, detects by radar an object (e.g., a vehicle, a pedestrian, a two-wheel vehicle, or the like) that is present in the road or the area therearound, and performs monitoring of traffic conditions and traffic management.

Examples of the monitoring of traffic conditions which is performed by the object detection device include detection of an amount of traffic, detection of a speeding vehicle, detection of a vehicle ignoring a traffic light, and the like. Further, an example of the traffic management that is performed by the object detection device is to control a traffic light in accordance with the amount of traffic detected. Another example of the traffic management that is performed by the object detection device is to detect an object that is present in a vehicle's blind spot and notify the driver of the vehicle of information on the object detected.

Such object detection devices employed in road infrastructure systems can realize efficiencies in traffic and prevent traffic accidents.

Further, conventionally, a radar apparatus has been installed to monitor a facility and an area therearound. Such a radar apparatus, for example, blocks intrusion by suspicious individuals by detecting an air or ground object and providing an associated security system with information on the detection result.

For example, Japanese Unexamined Patent Application Publication No. 2014-55883 discloses a technique for detecting by radar the extent of presence of an object and the direction in which the object travels. This technique has a plurality of transmitting and receiving antennas located in different positions, detects a position and a Doppler velocity based on each antenna, synthesizes a plurality of detection results, and calculates the extent and velocity of an object.

However, the aforementioned technique of Japanese Unexamined Patent Application Publication No. 2014-55883 has been only insufficiently capable of coping with different spatial resolutions.

SUMMARY

One non-limiting and exemplary embodiment provides an object detection device and an object detection method that can curb the influence of different spatial resolutions.

In one general aspect, the techniques disclosed here feature an object detection device including: first information generation circuitry which, in operation, in a plurality of first spatial cells divided from each other in each direction of transmission of a first radar signal that a first radar device transmits and at each first distance from the first radar device, calculates at least one first measured value concerning at least one first reflected signal from a target object which the first radar device receives; second information generation circuitry which, in operation, in a plurality of second spatial cells divided from each other in each direction of transmission of a second radar signal that a second radar device transmits and at each second distance from the second radar device, calculates at least one second measured value concerning at least one second reflected signal from the target object which the second radar device receives; region calculation circuitry which, in operation, based on the first measured value, selects at least one of the plurality of first spatial cells in which the target object is estimated to be present as a first target object region and that, based on the second measured value, selects at least one of the plurality of second spatial cells in which the target object is estimated to be present as a second target object region; measured value interpolation circuitry which, in operation, calculates a first interpolated measured value of the first target object region using the second measured value of the second target object region or calculates a second interpolated measured value of the second target object region using the first measured value of the first target object region; and object determination circuitry which, in operation, determines the target object using a combination of the first measured value and the first interpolated measured value or a combination of the second measured value and the second interpolated measured value.

It should be noted that general or specific embodiments may be implemented as a system, a method, an integrated circuit, a computer program, a storage medium, or any selective combination thereof.

According to the aspect of the present disclosure, an object detection device and an object detection method that can curb the influence of different spatial resolutions can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
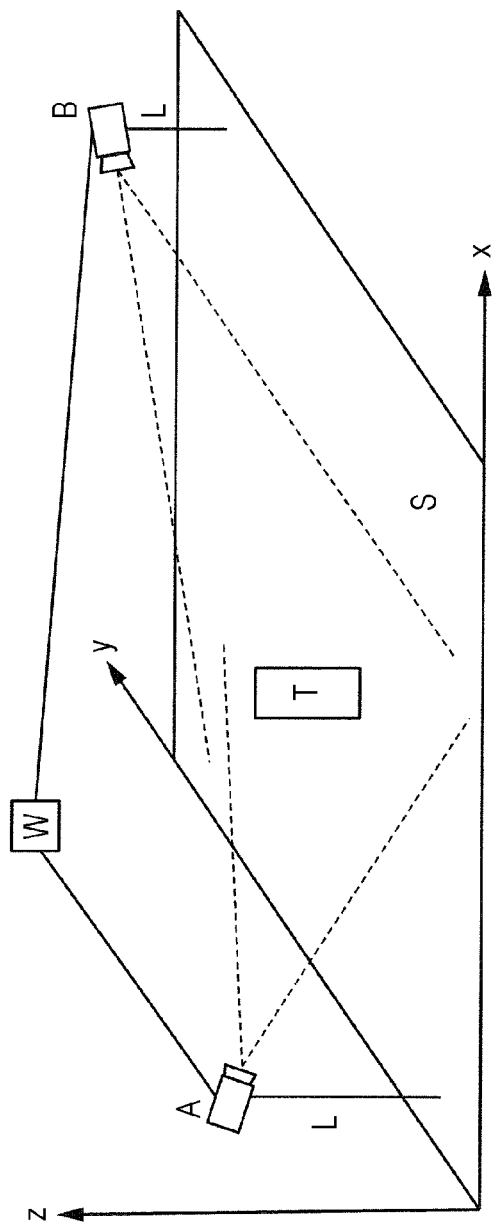
FIG. 1 is a conceptual diagram illustrating an example in which an object detection device according to the present disclosure is used together with radar devices in a roadway infrastructure system.

Underlying Knowledge Forming Basis of the Present Disclosure

First, underlying knowledge forming the basis of the present disclosure is described. The present disclosure relates to an object detection device that is used in a roadway infrastructure system.

An object detection device employed in a roadway infrastructure system is installed in a road or an area therearound and detects by radar an object (e.g., a vehicle, a pedestrian, a two-wheel vehicle, or the like) that is present in the road or the area therearound.

In comparison with an optical sensor such as a camera, a radar has the merit of being able to be utilized as usual even during the night, and exhibits excellent resistance to bad weather such as fog or rain. However, in a case where an object detection device installed in a road or an area therearound detects an object by radar, higher object identification capabilities are required than in a case where an object detection device installed in a vehicle detects an object by radar.

A reason for this is the diversity and multiplicity of objects in the road or the area therearound. At an intersection, for example, there are a large number of vehicles, motorcycles, pedestrians, bicycles, and the like traveling in different directions, and these objects come very close to one another or go by one another. This results in a tendency for occlusion to occur in the radar. Therefore, an object detection device installed in a road or an area therearound is required to have high object identification capabilities.

Another reason is that, in a road or an area therearound, a Doppler velocity measured by a radar becomes less marked as a feature of object identification. The Doppler velocity is a velocity in a radial direction centered on the radar. A change in Doppler velocity of an object which is measured by the radar of an object detection device installed in a road or an area therearound is greater than a Doppler velocity that is measured by the radar of an object detection device installed in a vehicle. In a road or an area therearound, circumstances may cause an object to travel in a tangential direction perpendicular to the radial direction, thus making it impossible to detect a Doppler velocity. Therefore, an object detection device installed in a road or an area therearound is required to have high object identification capabilities.

If provided with high object identification capabilities, an object detection device installed in a road or an area therearound can detect each separate object with different features and can therefore accurately grasp an amount of traffic or accurately predict the risk of a collision. On the other hand, if not provided with high object identification capabilities, the object detection device has difficulty in detecting each separate object with different features, thus omitting an object from the detection. Further, if not provided with high object identification capabilities, the object detection device has difficulty in accurately grasping traffic conditions, thus having difficulty in accurately predicting the risk of a collision.

Further, a radar device for use in a monitoring system which is installed in a facility such as an airport or a building or an area therearound is required to detect flying objects or birds in the sky or various vehicles or intruders on the ground, cooperate with an associated security system, block intrusion by suspicious individuals, and ensure the safety of the facility.

For example, the technique of Japanese Unexamined Patent Application Publication No. 2014-55883 determines the velocity of a flock of birds by taking the measured value of each antenna as a measured value for a spatial point, interpolating Doppler velocities at spatial points (mesh) around a point of measurement by a blurring process using a Gaussian filter, and synthesizing Doppler velocities corresponding to each separate antenna.

However, in a case where the process is performed using spatial regions in which the antennas are different from each other in terms of spatial resolution, the number of pieces of effective data from an antenna with low resolution becomes insufficient (a blurring process using a Gaussian filter lacking a rationale cannot increase the number of pieces of effective data) and therefore the technique of Japanese Unexamined Patent Application Publication No. 2014-55883 cannot achieve exact synthesis, although it is effective in a case where the process is performed using spatial regions in which the antennas are substantially equal in spatial resolution to each other. That is, the technique of Japanese Unexamined Patent Application Publication No. 2014-55883 has been only insufficiently capable of coping with different spatial resolutions.

Further, the blurring effect of Japanese Unexamined Patent Application Publication No. 2014-55883 may extend the area of influence of noise. The technique of Japanese Unexamined Patent Application Publication No. 2014-55883 does not take into account the influence of noise, since the object to be detected thereby is birds, which have a low intensity of reflection. However, in a case where the object to be detected is a vehicle or a pedestrian, the influence of noise must be taken into account.

In a case where an object is detected using a plurality of radars, it is necessary to install antennas at different positions and perform measurements with radars in different directions in order to enhance the interpolatability of measured values. Therefore, there are a large number of spatial regions varying greatly in spatial resolution. For example, in a case where two millimeter-wave radar antennas under the current specifications are installed at opposing corners of a standard intersection, there is an estimated maximum difference of spatial resolution of 20 times.

In view of these circumstances, the present disclosure has been reached with attention focused on curbing the influence of different spatial resolutions.

The present disclosure can provide an object detection device and an object detection method that can curb the influence of different spatial resolutions. This makes it possible to accurately detect without any omission the position and velocity of a vehicle, a two-wheel vehicle, a pedestrian, or the like that is present in a road or an area therearound and prevent a collision or, in particular, a traffic accident involving a pedestrian or a two-wheel vehicle.

Image of Utilization of the Present Disclosure

In the following, a place of installation of an object detection device according to the present disclosure is described with reference to FIG. 1. FIG. 1 is a conceptual diagram in which an object detection device according to the present disclosure is used together with radar devices in a roadway infrastructure system.

FIG. 1 illustrates radar devices A and B. The radar devices A and B are supported by support devices L such as poles, respectively. Each of the radar devices A and B includes a transmitter that transmits radar signals with sequential changes in direction at predetermined angular intervals, a receiver that receives reflected signals from a target object reflecting the radar signals, and a signal processor that acquires a delay profile (propagation delay characteristic) of the radar signals in each separate direction of transmission. Alternatively, the radar devices A and B may include such transmitters and receivers, respectively, and share such a signal processor with each other.

FIG. 1 also illustrates an object detection device W according to the present disclosure. The object detection device W is connected to the radar devices A and B and receives measurement information from the radar devices A and B. Note that it may employ any communication scheme, for example, it may employ a cable communication scheme or a wireless communication scheme.

FIG. 1 also illustrates a road surface S. The road surface S may be a straight road or a part of an intersection.

FIG. 1 also illustrates a target object T. The target object T corresponds, for example, to a vehicle, a motorcycle, a bicycle, a pedestrian, or the like.

In FIG. 1, the radar devices A and B may be installed above the road, on a roadside, above the intersection, or at each corner of the intersection. The present disclosure does not limit where and how the radar devices A and B are installed. It is convenient if the radar devices A and B can detect a target object (e.g., a vehicle, a pedestrian, a two-wheel vehicle, or the like) that is present in an area around a crosswalk at the intersection.

The present disclosure does not limit how the range of detection of the radar device A and the range of detection of the radar device B are positionally related to each other. However, since the present disclosure is applied to a range of overlap between the range of detection of the radar device A and the range of detection of the radar device B, it is preferable that the radar devices A and B be installed so that the range of overlap is large.

The present disclosure does not limit how the radar devices A and B are constituted. The radar devices A and B may both be products constituted by commercially-available ready-made products and publicly-known technologies.

The object detection device W may be contained in the radar device A or B, although the conceptual diagram illustrated in FIG. 1 assumes that the object detection device W is provided separately from the radar devices A and B.

Embodiments of the present disclosure are described in detail below with reference to the drawings. It should be noted that each of the embodiments described below is an example and the present disclosure is not limited by these embodiments.

Embodiment 1

Figure 2:
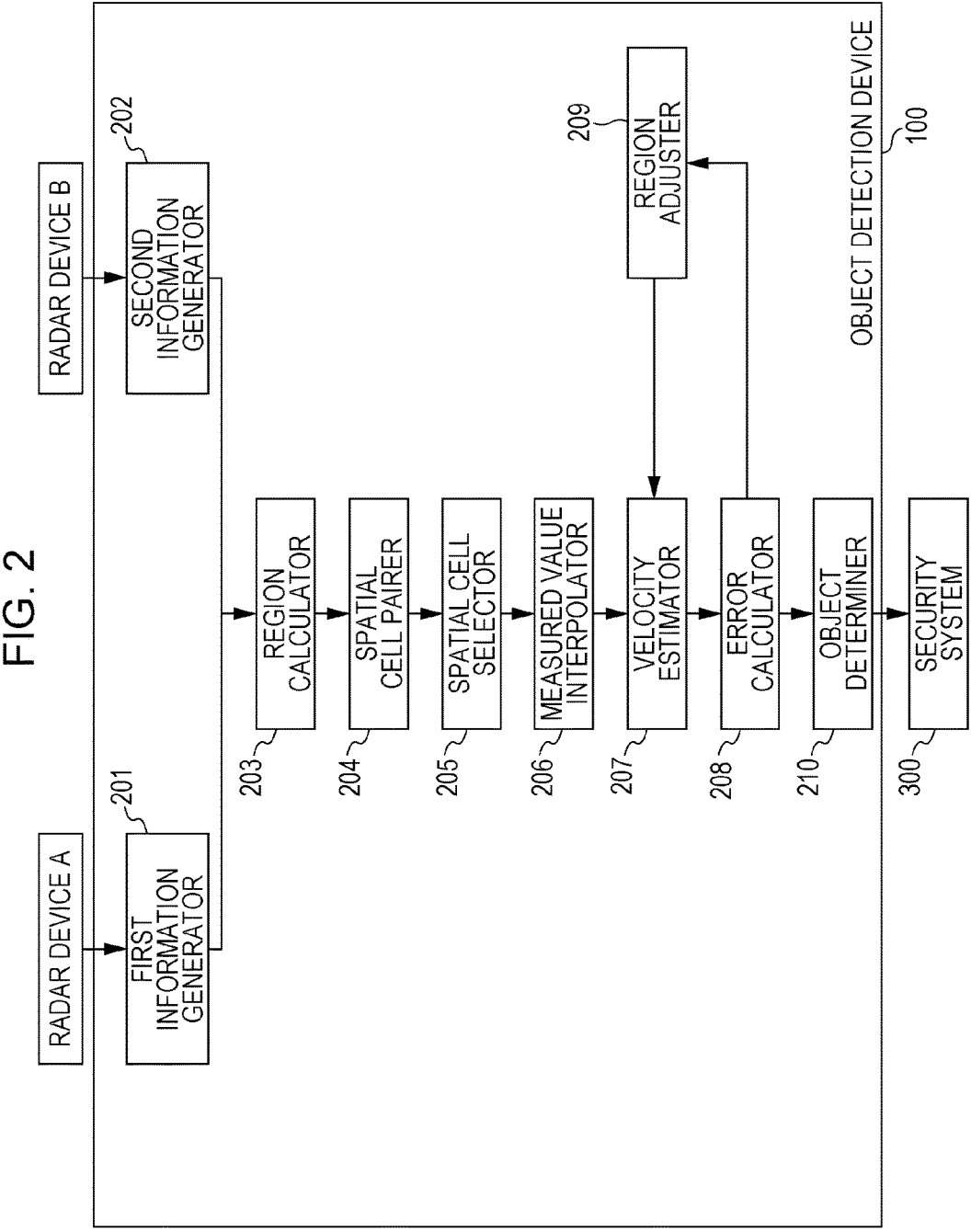
FIG. 2 is a block diagram illustrating main components of an object detection device according to Embodiment 1 of the present disclosure.

First, an object detection device according to Embodiment 1 of the present disclosure is described with reference to the drawings. FIG. 2 is a block diagram illustrating main components of an object detection device 100 according to Embodiment 1 of the present disclosure.

An object detection device 100 according to Embodiment 1 of the present disclosure is connected to the radar devices A and B and detects a target object using the radar devices A and B. It should be noted that the radar device A is an example of a "first radar device" and the radar device B is an example of a "second radar device".

The object detection device 100 includes a first information generator 201, a second information generator 202, a region calculator 203, a spatial cell pairer 204, a spatial cell selector 205, a measured value interpolator 206, a velocity estimator 207, an error calculator 208, a region adjuster 209, and an object determiner 210. Each component of the object detection device 100 can be achieved by hardware such as an LSI circuit.

The first information generator 201 receives delay profiles from the signal processor of the radar device A and calculates representative values (hereinafter referred to as "intensities of reflection") of received power of the reflected signals from the delay profiles for each of spatial cells (which are examples of first spatial cells) divided from each other at predetermined intervals of distance from the radar device A for each of directions of transmission (azimuths) of the radar signals. Then, the first information generator 201 generates power profile information indicating the respective intensities of reflection of the spatial cells. Typically, the intensities of reflection are continuous values. However, the intensities of reflection may be quantized by the first information generator 201 for simplicity of processing.

Further, the first information generator 201 receives delay profiles from the signal processor of the radar device A and calculates Doppler values of the target object from the delay profiles for each of spatial cells (which are examples of first spatial cells) divided from each other at predetermined intervals of distance from the radar device A for each of directions of transmission (azimuths) of the radar signals. Then, the first information generator 201 generates Doppler profile information indicating the respective Doppler values of the spatial cells.

Then, the first information generator 201 outputs the power profile information and the Doppler profile information to the region calculator 203. It should be noted that power profile information that is generated by the first information generator 201 is an example of "first power profile information" and Doppler profile information that is generated by the first information generator 201 is an example of "first Doppler profile information".

The following describes examples of power profile information and Doppler profile information that the first information generator 201 generates.

Figure 3:
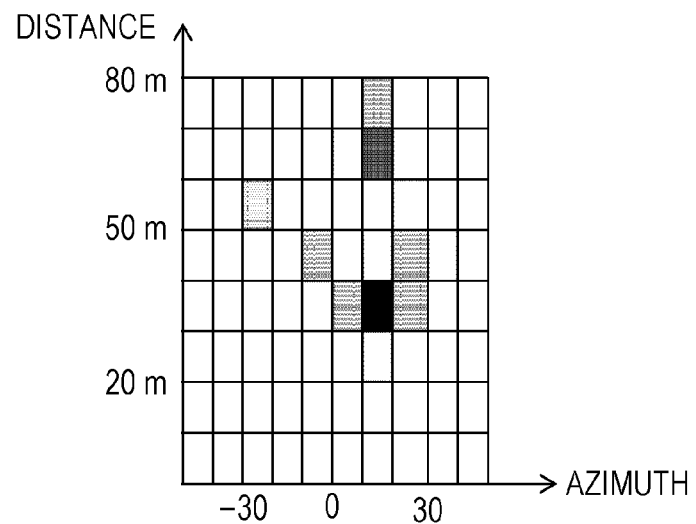
FIG. 3 is a diagram illustrating an example of power profile information in Embodiment 1 of the present disclosure.

First, the power profile information is described with reference to FIG. 3. FIG. 3 is a diagram illustrating an example of power profile information in Embodiment 1 of the present disclosure.

In FIG. 3, the horizontal axis represents the azimuth of the radar device A and the vertical axis represents the distance from the radar device A.

In the example of FIG. 3, the spatial cells are separated from each other at every azimuth of 10 degrees along the horizontal axis and at intervals of 10 m along the vertical axis. Each of the spatial cells represents a spatial resolution. In the present embodiment, the range of angles and distances of the spatial cells are not limited to those mentioned above. In terms of attaining a high resolution, it is preferable that each of the ranges be smaller.

In FIG. 3, the shades of gray of the spatial cells indicate intensities of reflection. A darker shade of gray indicates a higher intensity of reflection. For simplicity of explanation, the spatial cells other than particular spatial cells are all white.

Further, the present embodiment assumes that the intensity of reflection of each spatial cell is the maximum value of received power in the range of that spatial cell. However, the present disclosure is not limited to this. The intensity of reflection of each spatial cell may be another value such as an average value of received power in the range of that spatial cell.

Figure 4:
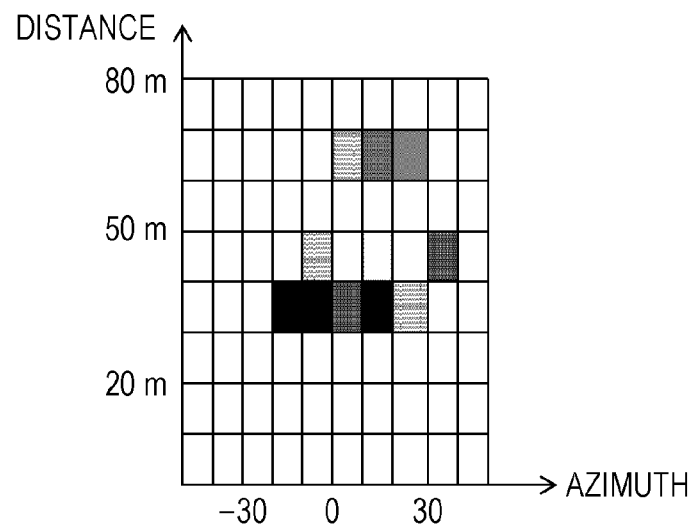
FIG. 4 is a diagram illustrating an example of Doppler profile information in Embodiment 1 of the present disclosure.

Next, the Doppler profile information is described with reference to FIG. 4. FIG. 4 is a diagram illustrating an example of Doppler profile information in Embodiment 1 of the present disclosure.

In FIG. 4, the horizontal axis represents the azimuth of the radar device A and the vertical axis represents the distance from the radar device A. Further, in the example of FIG. 4, the spatial cells are separated from each other at every azimuth of 10 degrees along the horizontal axis and at intervals of 10 m along the vertical axis. The spatial cells illustrated in FIG. 4 correspond to the spatial cells of the power profile information illustrated in FIG. 3, respectively.

In FIG. 4, the shades of gray of the spatial cells indicate Doppler values. A darker shade of gray indicates a higher Doppler value. For simplicity of explanation, the spatial cells other than particular spatial cells are all white.

Thus described are examples of power profile information and Doppler profile information. The following description deals with each of the spatial cells illustrated in FIGS. 3 and 4 as a single dot.

The second information generator 202 receives delay profiles from the signal processor of the radar device B and calculates intensities of reflection from the delay profiles for each of spatial cells (which are examples of second spatial cells) divided from each other at predetermined intervals of distance from the radar device B for each of directions of transmission of the radar signals. Then, the second information generator 202 generates power profile information indicating the respective intensities of reflection of the spatial cells. Typically, the intensities of reflection are continuous values. However, the intensities of reflection may be quantized by the second information generator 202 for simplicity of processing.

Further, the second information generator 202 receives delay profiles from the signal processor of the radar device B and measures Doppler values of the target object from the delay profiles for each of spatial cells (which are examples of second spatial cells) divided from each other at predetermined intervals of distance from the radar device B for each of directions of transmission of the radar signals. Then, the second information generator 202 generates Doppler profile information indicating the respective Doppler values of the spatial cells.

Then, the second information generator 202 outputs the power profile information and the Doppler profile information to the region calculator 203. It should be noted that power profile information that is generated by the second information generator 202 is an example of "second power profile information" and Doppler profile information that is generated by the second information generator 202 is an example of "second Doppler profile information".

As described above, the functions of the second information generator 202 are the same as the functions of the first information generator 201. However, since the radar device B is located at a different position from the radar device A, power profile information and Doppler profile information generated by the second information generator 202 are different from power profile information and Doppler profile information generated by the first information generator 201.

Figure 5:
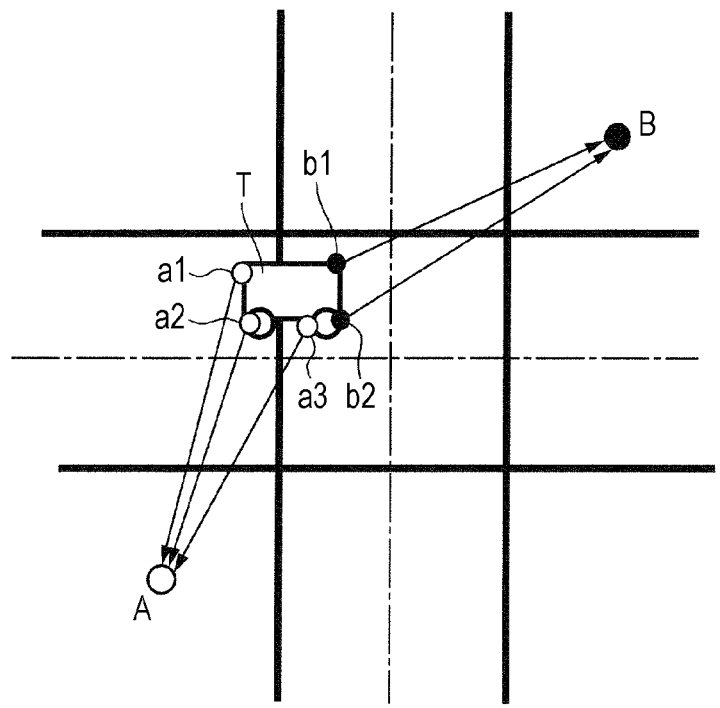
FIG. 5 is a diagram illustrating an example of a case where two radar devices in Embodiment 1 of the present disclosure irradiate the same target object with radar.

For example, as illustrated in FIG. 5, in a case where the radar devices A and B receive reflected signals from the same target object T (e.g., a vehicle traveling near the intersection), the radar device A receives reflected signals from sites a1, a2, and a3 of the target object T and the radar device B receives reflected signals from sites b1 and b2 of the target object T. Accordingly, a delay profile that is outputted from the radar device A to the first information generator 201 and a delay profile that is outputted from the radar device B to the second information generator 202 are different. Therefore, power profile information and Doppler profile information that are generated by the first information generator 201 and power profile information and Doppler profile information that are generated by the second information generator 202 are different in terms of the number, positions, and values (e.g., intensities of reflection and Doppler values) of cells associated with the target object T. This tendency becomes more obvious with higher resolution radars.

The region calculator 203 selects a target object region (hereinafter referred to as "first target object region") from among the plurality of spatial cells on the basis of the power profile and Doppler profile information generated by the first information generator 201. Further, the region calculator 203 selects a target object region (hereinafter referred to as "second target object region") from among the plurality of spatial cells on the basis of the power profile and Doppler profile information generated by the second information generator 202. A target object region is at least one spatial cell in which the target object T is estimated to be present.

The aforementioned calculation of a target object region can be achieved by a publicly-known radar signal processing technique. A target object region is a group of spatial cells. Note, however, that a target object region does not need to be a continuous region but may be a group of discontinuous dots or discontinuous subregions. The aforementioned first and second target object regions and spatial cells constituting these regions will be described later with reference to FIG. 6.

Then, the region calculator 203 outputs target object region information indicating the first and second target object regions to the spatial cell pairer 204. The target object region information contains measured values (e.g., distances, azimuths, intensities of reflection, and Doppler values) of the spatial cells constituting the first and second target object regions.

The spatial cell pairer 204 determines, on the basis of the target object region information, whether the first and second target object regions correspond to the same target object T. For example, the spatial cell pairer 204 calculates a spatial distance between the first and second target object regions on the basis of the predetermined locations of the radar devices A and B. If this spatial distance is smaller than a predetermined threshold value, the spatial cell pairer 204 pairs the first and second target object regions with each other.

As a result of the pairing, for example, a spatial cell constituting the first target object region and a spatial cell of a space in which the second target object region is located may form a pair, or a spatial cell constituting the first target object region and a plurality of spatial cells of a space in which the second target object region is located may form a pair. Alternatively, for example, a spatial cell constituting the second target object region and a plurality of spatial cells of a space in which the first target object region is located may form a pair.

Then, the spatial cell pairer 204 outputs pairing information indicating the paired spatial cells to the spatial cell selector 205. The pairing information contains measured values (e.g., distances, azimuths, intensities of reflection, and Doppler values) of the spatial cells of the target object regions paired with each other.

The spatial cell selector 205 selects, on the basis of the spatial resolutions of the radar devices A and B, either of the first and second target object regions paired with each other.

Figure 6:
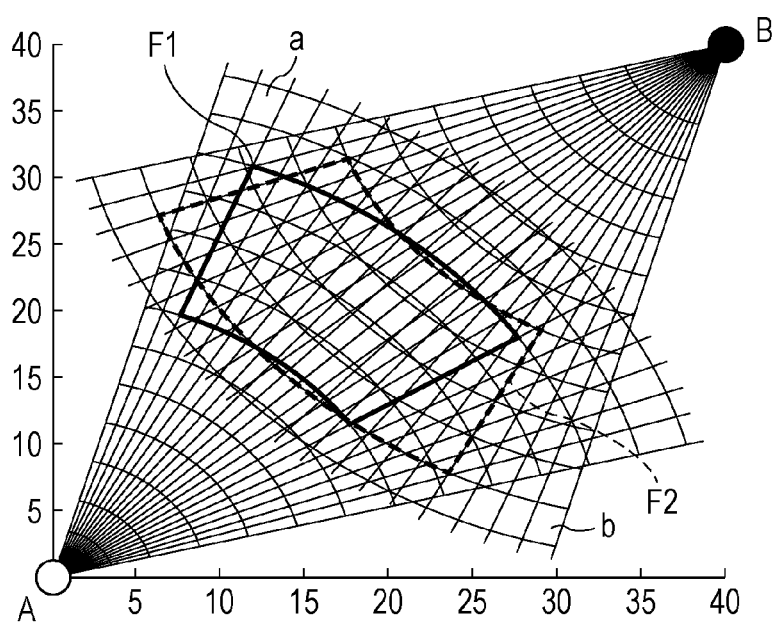
FIG. 6 is a diagram illustrating examples of spatial cells in Embodiment 1 of the present disclosure.

An example of selection of spatial cells is described here with reference to FIG. 6. FIG. 6 illustrates an example of a distribution of spatial cells corresponding to the radar devices A and B in a case where the radar devices A and B are installed facing each other. In FIG. 6, the horizontal and vertical axes represent the distance from the radar device A. Further, in FIG. 6, F1 denotes an example of a first target object region. F2 denotes an example of a second target object region. The first target object region F1 is constituted by a plurality of spatial cells a. The second target object region F2 is constituted by a plurality of spatial cells b. It should be noted that the spatial cells a are examples of "first spatial cells" and the spatial cells b are examples of "second spatial cells".

As illustrated in FIG. 6, each of the spatial cells a is larger than the other with increasing distance from the radar device A, and each of the spatial cells b is larger than the other with increasing distance from the radar device B. Accordingly, in a case where a spatial cell a located close to the radar device A and a spatial cell b located away from the radar device B are paired with each other, the spatial cell a is smaller than the spatial cell b. Similarly, in a case where a spatial cell a located close to the radar device B and a spatial cell b located away from the radar device A are paired with each other, the spatial cell a is larger than the spatial cell b.

In such a case, the spatial cell selector 205 selects, from among the target object regions paired with each other, the target object region constituted by spatial cells that are smaller in size. For example, in a case where the first target object region F1 and the second target object region F2 are paired with each other, the spatial cell selector 205 compares an average value of the sizes of the spatial cells belonging to the first target object region F1 and an average value of the sizes of the spatial cells belonging to the second target object region F2 and selects the target object region that is smaller in average value.

Thus described is an example of selection of spatial cells.

Then, the spatial cell selector 205 outputs selection result information indicating the selected spatial cells and the paired spatial cells to the measured value interpolator 206. The selection result information contains a value indicating which target object region was selected (e.g., which of the first and second target object regions F1 and F2 was selected) and measured values (e.g., distances, azimuths, intensities of reflection, and Doppler values) of the spatial cells of the target object regions paired with each other.

The measured value interpolator 206 interpolates the measured values of the spatial cells of the target object region that was selected by the spatial cell selector 205 using the measured values of the spatial cells of the target object region that was not selected by the spatial cell selector 205. The measured values to be interpolated here are for example Doppler values.

Figure 7A:
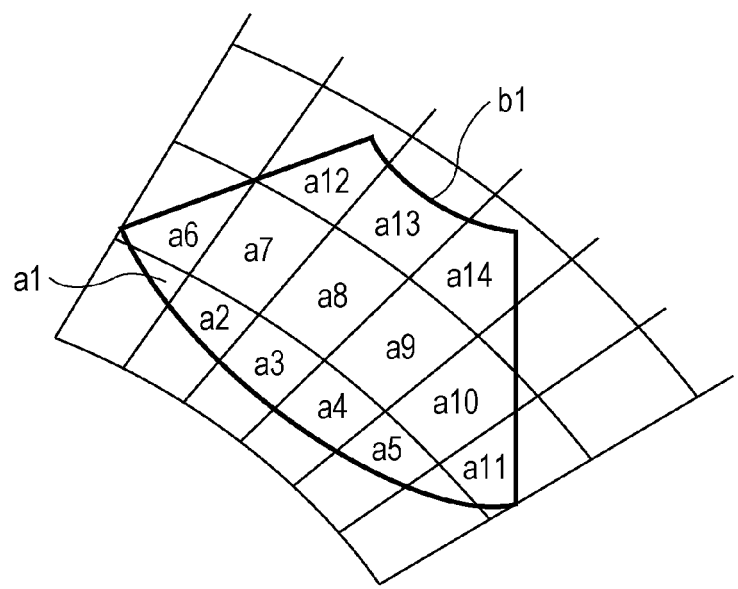
FIGS. 7A and 7B illustrate diagrams explaining an example of a process that is performed by a measured value interpolator in Embodiment 1 of the present disclosure.
Figure 7B:
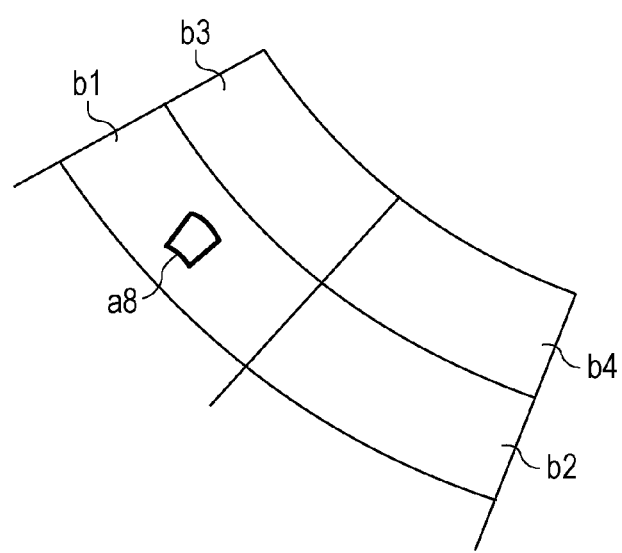

An example of interpolation of measured values is described here with reference to FIGS. 7A and 7B. FIG. 7A illustrates examples of spatial cells a of a first target object region F1 and examples of spatial cells b of a second target object region F2 paired with the first target object region F1. FIG. 7B illustrates an example of a spatial cell a whose measured value is interpolated and examples of spatial cells b that are used in the interpolation.

In FIG. 7A, for example, a spatial cell b1 and a plurality of spatial cells a1 to a14 are paired. Further, in FIG. 7A, for example, the plurality of spatial cells a1 to a14 are spatial cells that were selected by the spatial cell selector 205, and the spatial cell b1 is a spatial cell that was not selected by the spatial cell selector 205. Although FIG. 7A illustrates an example in which the spatial cell b1 and the spatial cells a overlapping the spatial cellb1 for large enough parts (e.g., by predetermined sizes or larger) are paired, the spatial cell b1 and all of the spatial cells a at least partially overlapping the spatial cell b1 may be paired.

In FIG. 7A, the measured value interpolator 206 interpolates the Doppler values of the plurality of spatial cells a1 to a14, which are affected by the spatial cell b1. A case where the Doppler value of the spatial cell a8 is interpolated is described here as an example with reference to FIG. 7B.

Let it be assumed, as illustrated in FIG. 7B, that spatial cells b2 to b4 are present around the spatial cell b1. In this case, the measured value interpolator 206 interpolates the Doppler value of the spatial cell a8 by bilinear interpolation from the Doppler values of the spatial cells b1 to b4.

Although in FIG. 7B it is assumed that the spatial cells b2 to b4 are spatial cells b around the spatial cell b1 which are used in the interpolation, the number and positions of spatial cells b around the spatial cell b1 which are used in the interpolation are not limited, provided they are present around the spatial cell b1.

Alternatively, without being limited to bilinear interpolation, the measured value interpolator 206 may for example use a nonlinear interpolation method. Alternatively, the measured value interpolator 206 may interpolate the Doppler value of the spatial cell a8 using the largest value of the Doppler values of the spatial cells b1 to b4 or an average value of the Doppler values of the spatial cells b1 to b4. Alternatively, the measured value interpolator 206 may for example adopt the Doppler value of the spatial cell b1 as the Doppler value of the spatial cell a8 with no change.

The measured value interpolator 206 also interpolates the Doppler values of the other spatial cells a1 to a14 in the same manner as the aforementioned interpolation for the spatial cell a8.

Thus described is an example of interpolation of measured values.

Then, the measured value interpolator 206 outputs interpolation result information to the velocity estimator 207. The interpolation result information contains actually measured values of the spatial cells constituting the target object region that was selected by the spatial cell selector 205 and interpolated measured values (e.g., distances, azimuths, intensities of reflection, and Doppler values) of the spatial cells of the target object regions paired with each other.

The velocity estimator 207 estimates the actual velocity (also referred to as "absolute velocity") of the target object T on the basis of the interpolation result information.

Figure 8:
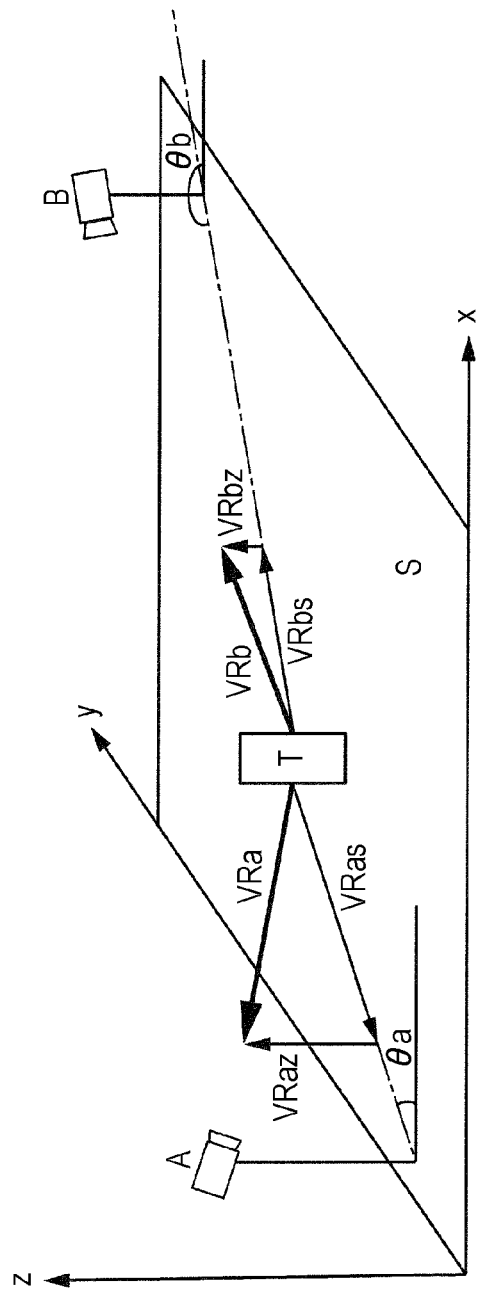
FIG. 8 is a diagram explaining an example of a process that is performed by a velocity estimator in Embodiment 1 of the present disclosure.

An example of estimation of the actual velocity of the target object T is described here with reference to FIG. 8. Let it be assumed here for example that interpolated measured values are calculated from measured values of spatial cells b.

In FIG. 8, θa is the azimuth of a spatial cell a, VRa is the Doppler value of a spatial cell a, θb is the azimuth of a spatial cell b, and VRb is the Doppler value of a spatial cell b. The radar devices A and B use a common reference direction for the azimuth. The Doppler value is a velocity in a radial direction with respect to each radar device.

The velocity estimator 207, which already knows the height at which the radar device A is installed and the distance between the radar device A and the target object T, resolves the Doppler value VRa into a quantity (hereinafter referred to as "planar quantity") VRas in the x-y plane (road surface S) and a quantity (hereinafter referred to as "perpendicular quantity") VRaz in the perpendicular direction z.

Further, the velocity estimator 207, which already knows the height at which the radar device B is installed and the distance between the radar device B and the target object T, resolves the Doppler value VRb into a planar quantity VRbs and a perpendicular quantity VRbz.

Furthermore, the velocity estimator 207 resolves each of the planar quantities VRas and VRbs into an x-direction quantity and a y-direction quantity.

Let it be assumed here that the actually measured values of spatial cell a are ($\theta_i$, Vs, i), where i=1 to m. Let it be also assumed that the interpolated measured values calculated from the measured values of spatial cell b are ($\theta_i$, Vs, i), where i=m+1 to m+n. The m+n measured values correspond to different points of reflection on the same target object T. Therefore, if the actual velocity of the target object T is expressed as (Vx, Vy), the following mathematical expression (1) holds:

$$\begin{bmatrix} V_{s,1} \\ V_{s,2} \\ \vdots \\ V_{s,m+n} \end{bmatrix} = \begin{bmatrix} \cos(\theta_1) & \sin(\theta_1) \\ \cos(\theta_2) & \sin(\theta_2) \\ \vdots & \vdots \\ \cos(\theta_{m+n}) & \sin(\theta_{m+n}) \end{bmatrix} \begin{bmatrix} V_x \\ V_y \end{bmatrix} \quad (1)$$

In the foregoing mathematical expression (1), Vx is a velocity in an x-axis direction on the x-y plane and Vy is a velocity in a y-axis direction on the x-y plane. For the foregoing mathematical expression (1), refer to F. Folster and H. Rohling, Lateral Velocity Estimation Based on Automotive Radar Sensors, Internal Conference on Radar, 2006.

The velocity estimator 207 calculates the actual velocity of the target object T according to the foregoing mathematical expression (1). A specific utilizable example of the calculation method is a regression calculation technique such as the least squares method. In such calculation of the velocity of a target object, the number of interpolated measured values interpolated by the measured value interpolator 206 approximates to the number of actually measured values (i.e., n and m). This improves the accuracy of regression calculation and avoids abnormal value determination.

Then, the velocity estimator 207 outputs estimation result information to the error calculator 208. The estimation result information contains the estimated actual velocity of the target object T, the actually measured values (e.g., distances, azimuths, intensities of reflection, and Doppler values) of the spatial cells that were selected by the spatial cell selector 205, and the interpolated measured values (e.g., distances, azimuths, intensities of reflection, and Doppler values) of the spatial cells as interpolated by the measured value interpolator 206.

The error calculator 208 calculates errors between the actually measured values and the interpolated measured values on the basis of the estimation result information. For example, the error calculator 208 extracts measured values having large errors, i.e., spatial cells whose Doppler values do not match the actual velocity of the target object T. For example, in the case of utilization of the least squares method, where the result of regression calculation takes the form of a straight line, the error calculator 208 can measure the errors as the distances between the measured values and the straight line.

In a case where the errors are larger than a predetermined threshold value (or equal to or larger than the predetermined threshold value), the error calculator 208 outputs, to the region adjuster 209, error distribution information indicating a distribution of the errors and the estimation result information inputted from the velocity estimator 207.

On the other hand, in a case where the errors are equal to or smaller than the predetermined threshold value (or smaller than the predetermined threshold value), the error calculator 208 outputs, to the object determiner 210, the estimation result information inputted from the velocity estimator 207. Alternatively, after a process by the region adjuster 209 mentioned below, the error calculator 208 outputs the adjusted estimation result information to the object determiner 210.

The region adjuster 209 reselects at least one spatial cell of the selected target object region on the basis of the error distribution information and the estimation result information. That is, the region adjuster 209 adjusts the target object region by excluding a certain number of spatial cells from the spatial cells having large errors on the basis of the calculated errors. Then, the region adjuster 209 outputs adjustment result information indicating the adjusted target object region to the velocity estimator 207. The adjustment result information contains the measured values (e.g., azimuths, distances, and Doppler values) of the spatial cells constituting the adjusted target object region. As measured values corresponding to the spatial cells, either the actually measured values or the interpolated measured values are used. The velocity estimator 207 again performs a regression calculation on the basis of the adjustment result information. In this manner, the velocity estimator 207, the error calculator 208, and the region adjuster 209 repeat their respective processes until the errors become smaller than the predetermined threshold value. In a case where the adjustment result information that is outputted from the region adjuster 209 is inputted to the velocity estimator 207, the measured value interpolator 206 omits a regression computation for the interpolated measured values.

The region adjuster 209 may output the adjustment result information to the region calculator 203. In that case, the region calculator 203 again calculates a target object region on the basis of the adjustment result information. In this case, the measured value interpolator 206 performs a regression computation for the interpolated measured values.

The object determiner 210 determines at least one of the position, size, shape, type (e.g., large-sized vehicle, small-sized vehicle, two-wheel vehicle, or pedestrian) of the target object T on the basis of the estimation result information or the adjusted estimation result information. Then, the object determiner 210 outputs information indicating a determination result and information indicating the actual velocity of the target object T to a security system 300 located outside the object detection device 100. In a case where the security system 300 is a roadway infrastructure system, the security system 300 controls traffic signals or notifies the drivers of vehicles of information on the object detected. In a case where the security system 300 is a facility surveillance system, the security system 300 sounds an alarm in order to block intrusion by suspicious individuals or vehicles.

In Embodiment 1 of the present disclosure, the object determiner 210 is not limited to any specific determination method. For example, the object determiner 210 may make a determination by holding in advance a template model of the size and shape of a target object region that correspond to the type of target object and comparing the template model and information on the target object region. Alternatively, the object determiner 210 may make a determination by comparing a template model of a distribution of intensities of reflection that corresponds to the type of target object and information on the target object region.

Alternatively, the object detection device 100 may be configured not to include the error calculator 208 and the region adjuster 209 (same applies to Embodiments 2 to 4 described below), although, in Embodiment 1 of the present disclosure, the object detection device 100 is configured to include the error calculator 208 and the region adjuster 209.

Embodiment 1 of the present disclosure described above can provide an object detection device and an object detection method that can curb the influence of different spatial resolutions. This makes it possible to accurately detect the position and velocity of a vehicle, a two-wheel vehicle, a pedestrian, or the like that is present in a road or an area therearound and prevent a collision or, in particular, a traffic accident involving a pedestrian or a two-wheel vehicle.

Embodiment 2

Figure 9:
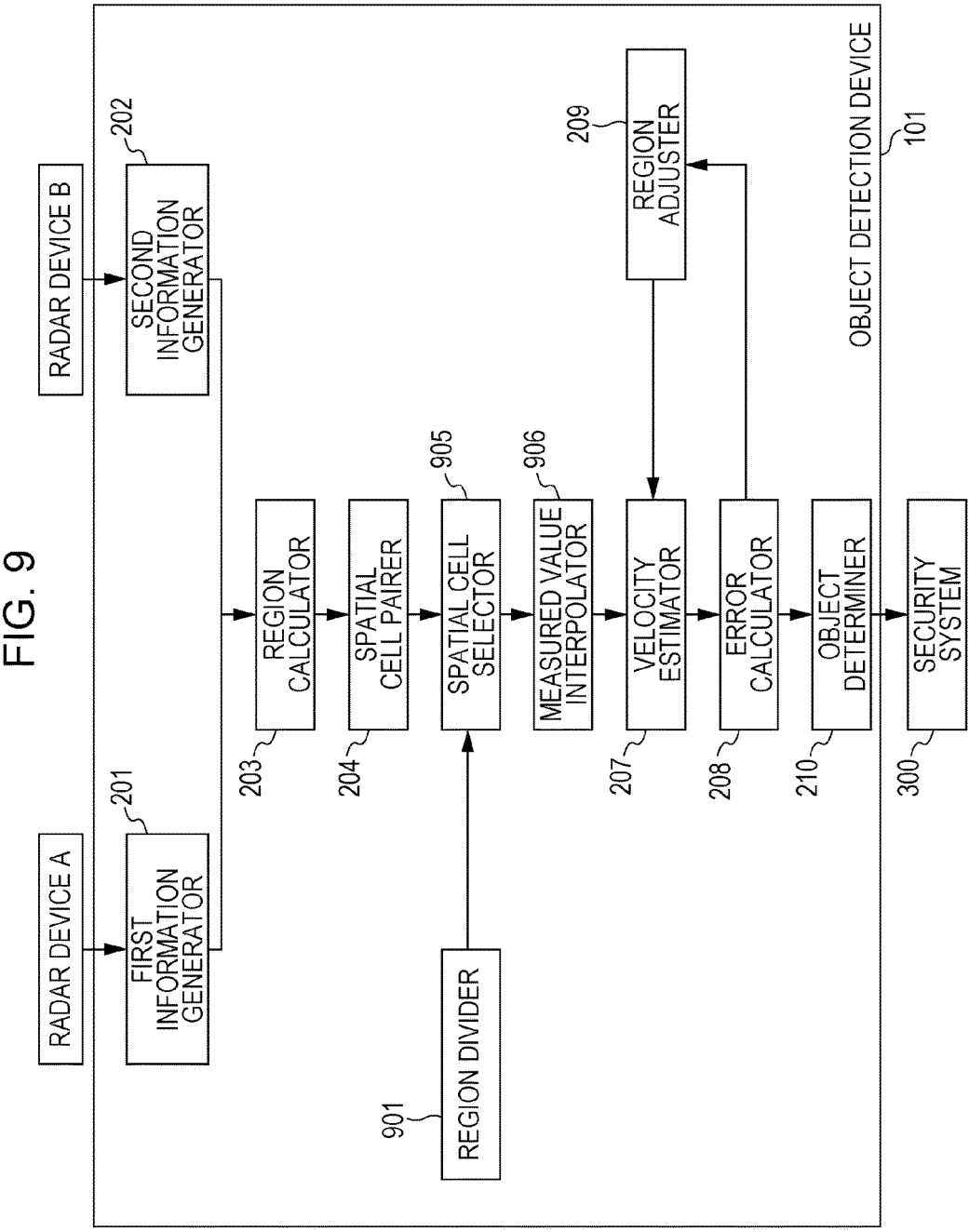
FIG. 9 is a block diagram illustrating main components of an object detection device according to Embodiment 2 of the present disclosure.

Next, an object detection device according to Embodiment 2 of the present disclosure is described with reference to the drawings. FIG. 9 is a block diagram illustrating main components of an object detection device 101 according to Embodiment 2 of the present disclosure. In FIG. 9, components identical to those illustrated in FIG. 2 are given the same signs, and a detailed description thereof is omitted. As illustrated in FIG. 9, the object detection device 101 is configured to further include a region divider 901 and to include a spatial cell selector 905 and a measured value interpolator 906 in place of the spatial cell selector 205 and the measured value interpolator 206 illustrated in FIG. 2, respectively.

The region divider 901 divides a region in which measurements are performed by the radar devices A and B into a plurality of regions, e.g., three regions (which are examples of divided regions). The three regions are divided, for example, into a region that is closer to the radar device A than to the radar device B (hereinafter referred to as "radar device A neighboring region", which is an example of a first divided region), a region that is closer to the radar device B than to the radar device A (hereinafter referred to as "radar device B neighboring region", which is an example of a second divided region), and a region that is substantially the same distance from the radar devices A and B (hereinafter referred to as "intermediate region", which is an example of a third divided region). The region divider 901 outputs division result information indicating a division result to the spatial cell selector 905. The division result information contains the values of distances and azimuths of spatial cells constituting the radar device A neighboring region, spatial cells constituting the radar device B neighboring region, and spatial cells constituting the intermediate region.

The spatial cell selector 905 selects, on the basis of the pairing information inputted from the spatial cell pairer 204 and the division result information inputted from the region divider 901, either of the first and second target object regions paired with each other. Alternatively, the spatial cell selector 905 determines, on the basis of the pairing information and the division result information, to select neither of the first and second target object regions paired with each other. As described in Embodiment 1, the pairing information contains measured values (e.g., distances, azimuths, intensities of reflection, and Doppler values) of the spatial cells of the target object regions paired with each other.

For example, the spatial cell selector 905 selects the first target object region F1 in a case where the first and second target object regions F1 and F2 paired with each other are located in the radar device A neighboring region. For example, in a case where a predetermined number or more of paired spatial cells a and b overlap the spatial cells of the radar device A neighboring region, the spatial cell selector 905 selects the spatial cells a (see FIG. 6) constituting the first target object region F1.

Alternatively, for example, the spatial cell selector 905 selects the second target object region F2 in a case where the first and second target object regions F1 and F2 paired with each other are located in the radar device B neighboring region. For example, in a case where a predetermined number or more of paired spatial cells a and b overlap the spatial cells of the radar device B neighboring region, the spatial cell selector 905 selects the spatial cells b (see FIG. 6) constituting the second target object region F2.

Alternatively, for example, the spatial cell selector 905 selects neither the first target object region F1 nor the second target object region F2 in a case where the first and second target object regions F1 and F2 paired with each other are located in the intermediate region. For example, in a case where a predetermined number or more of paired spatial cells a and b overlap the spatial cells of the intermediate region, the spatial cell selector 905 selects neither the spatial cells a (see FIG. 6) constituting the first target object region F1 nor the spatial cells b (see FIG. 6) constituting the second target object region F2.

Then, in a case where the spatial cell selector 905 selected either of the target object regions, the spatial cell selector 905 outputs selection result information to the measured value interpolator 906. The selection result information contains a value indicating which spatial cells constitute the selected target object region (e.g., which of the spatial cells a and b were selected) and measured values (e.g., distances, azimuths, intensities of reflection, and Doppler values) of the spatial cells of the target object regions paired with each other.

On the other hand, in a case where the spatial cell selector 905 selected neither of the target object regions, the spatial cell selector 905 outputs selection result information to the measured value interpolator 906. The selection result information contains a value indicating that neither of the target object regions was selected and measured values (e.g., distances, azimuths, intensities of reflection, and Doppler values) of the spatial cells of the target object regions paired with each other.

For example, in a case where the selection result information contains a value indicating which of the spatial cells were selected, the measured value interpolator 906 interpolates the measured values (e.g., Doppler values) of the spatial cells that were selected by the spatial cell selector 905 using the measured values (e.g., Doppler values) of the spatial cells that were not selected by the spatial cell selector 905.

For example, in a case where the selection result information contains a value indicating that the spatial cells a were selected, the measured value interpolator 906 interpolates the interpolated Doppler values of the spatial cells a paired with the spatial cells b using the Doppler values of the spatial cells b. For example, in a case where the selection result information contains a value indicating that the spatial cells b were selected, the measured value interpolator 906 interpolates the interpolated Doppler values of the spatial cells b paired with the spatial cells a using the Doppler values of the spatial cells a.

Further, for example, in a case where the selection result information contains a value indicating that neither the spatial cells a nor the spatial cells b were selected, the measured value interpolator 906 does not interpolate Doppler values and keep the Doppler values of the spatial cells a and the Doppler values of the spatial cells b unchanged.

Embodiment 2 of the present disclosure described above can bring about the aforementioned effects of Embodiment 1 and, furthermore, can reduce the amount of calculation in the spatial cell selector 905, as the spatial cells to be interpolated are selected on the basis of the spatial cells of the regions divided by the region divider 901.

Embodiment 3

Figure 10:
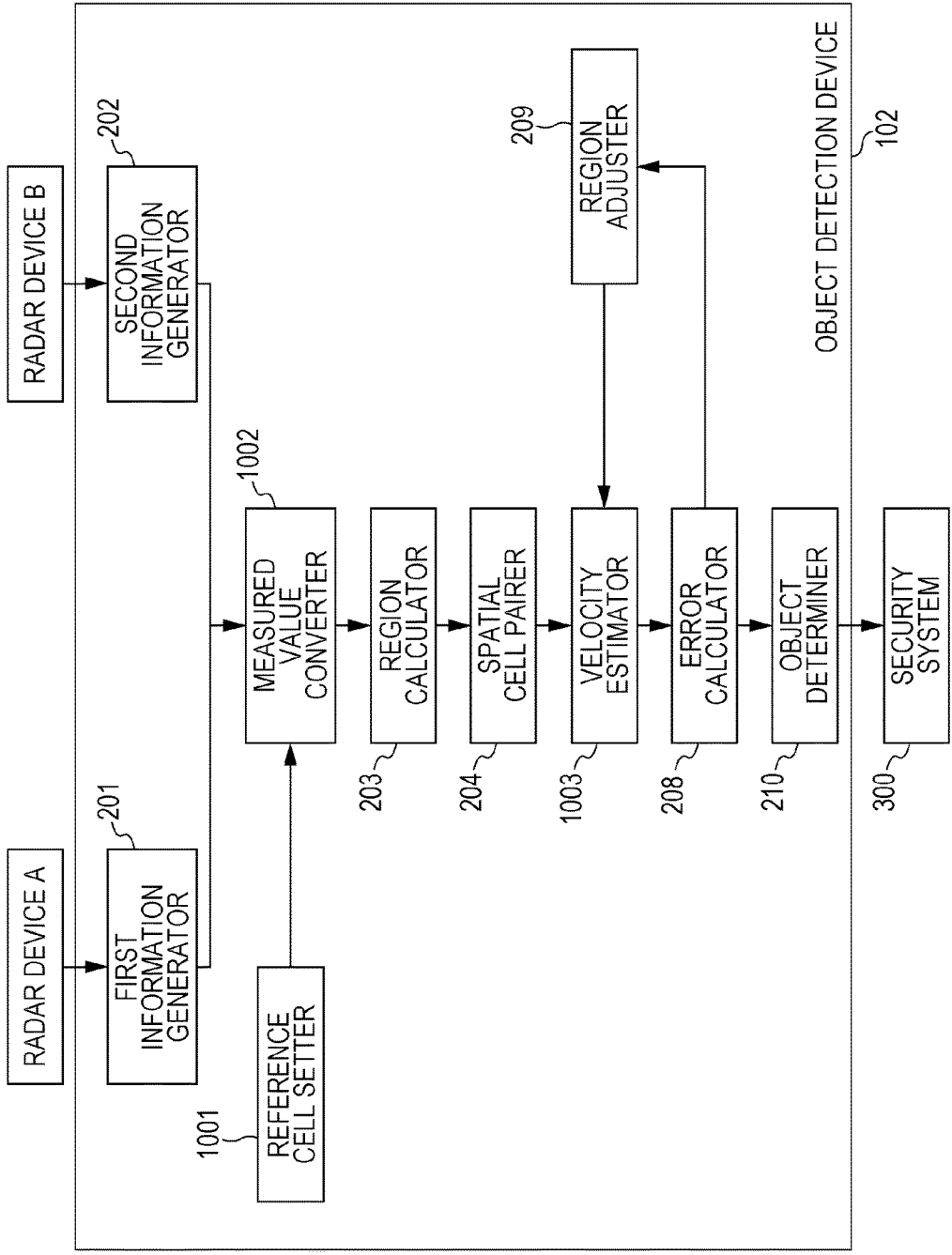
FIG. 10 is a block diagram illustrating main components of an object detection device according to Embodiment 3 of the present disclosure.

Next, an object detection device according to Embodiment 3 of the present disclosure is described with reference to the drawings. FIG. 10 is a block diagram illustrating main components of an object detection device 102 according to Embodiment 3 of the present disclosure. In FIG. 10, components identical to those illustrated in FIG. 2 are given the same signs, and a detailed description thereof is omitted. As illustrated in FIG. 10, the object detection device 102 is configured to further include a reference cell setter 1001 and a measured value converter 1002, to include a velocity estimator 1003 in place of the velocity estimator 207 illustrated in FIG. 2, and not to include the spatial cell selector 205 or the measured value interpolator 206.

Figure 11:
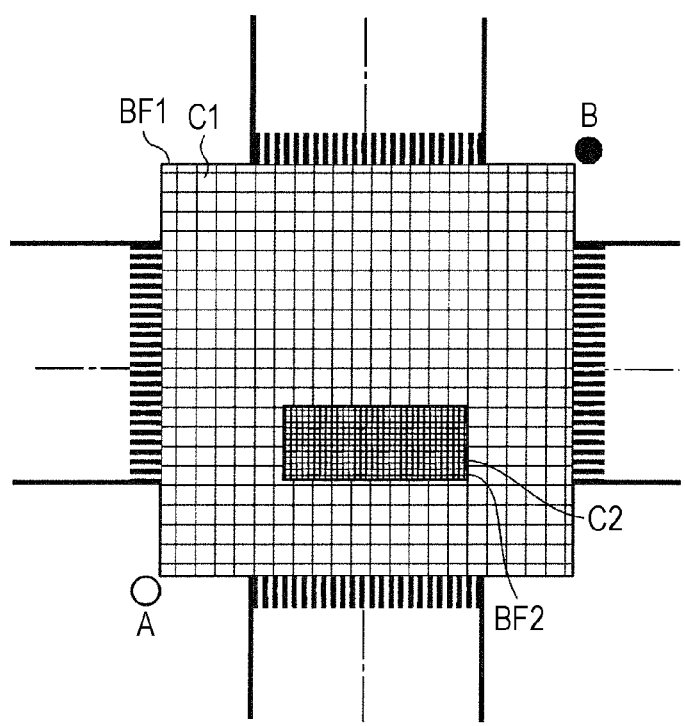
FIG. 11 is a diagram illustrating examples of reference cells in Embodiment 3 of the present disclosure.

The reference cell setter 1001 sets reference cells. The reference cells are cells that constitute at least a part of a region in which measurements are performed by the radar devices A and B. FIG. 11 illustrates examples of the reference cells. FIG. 11 illustrates a reference region set at an intersection and cells constituting the region. For example, a reference region BF1 is a region that corresponds to the inside of the intersection, and is constituted by a plurality of reference cells C1. Further, for example, a reference region BF2 is a region inside the intersection which is narrower than the reference region BF1, and is constituted by a plurality of reference cells C2. The reference cell setter 1001 may set either the reference cells C1 of the reference region BF1 or the reference cells C2 of the reference region BF2.

It should be noted that the positions, shapes, and number of reference cells that are set by the reference cell setter 1001 are not limited to those illustrated in FIG. 11. For example, it is preferable that reference cells be set in a crossroad, which is considered to be an important area, and an area therearound.

Then, the reference cell setter 1001 outputs reference cell information indicating the set reference cells to the measured value converter 1002. The reference cell information contains values such as the azimuths and distances of the reference cells.

The measured value converter 1002 associates the measured value of at least one spatial cell of the power profile information and Doppler information inputted from the first information generator 201 with each spatial cell of the reference cell information inputted from the reference cell setter 1001. Further, the measured value converter 1002 associates the measured value of at least one spatial cell of the power profile information and Doppler information inputted from the second information generator 202 with each spatial cell of the reference cell information inputted from the reference cell setter 1001.

A description is given here by taking as an example a case where the reference cell information indicates the reference region BF1 illustrated in FIG. 11 and the plurality of spatial cells C1 constituting the region.

In this case, the measured value converter 1002 associates the measured values of the spatial cells indicated by the power profile information and Doppler profile information inputted from the first information generator 201 with the reference cells C1 indicated by the reference cell information. This causes the power profile information and Doppler profile information inputted from the first information generator 201 to be converted into information indicating the measured values of the reference cells C1.

Further, the measured value converter 1002 associates the measured values of the spatial cells indicated by the power profile information and Doppler profile information inputted from the second information generator 202 with the reference cells C1 indicated by the reference cell information. This causes the power profile information and Doppler profile information inputted from the second information generator 202 to be converted into information indicating the measured values of the reference cells C1.

Then, the measured value converter 1002 outputs, to the region calculator 203, the power profile information and Doppler profile information inputted from the first information generator 201 and then converted as above and the power profile information and Doppler profile information inputted from the second information generator 202 and then converted as above. The region calculator 203 calculates the first and second target object regions as described in Embodiment 1 on the basis of the power profile information and Doppler profile information inputted from the measured value converter 1002.

The velocity estimator 1003 estimates the velocity using the measured values of paired reference cells outputted from the spatial cell pairer 204. The process of the velocity estimator 1003 is basically the same as that of the velocity estimator 207, but differs in that the input data have changed from measured values and interpolated measured values to measured values.

Embodiment 3 of the present disclosure described above can bring about the aforementioned effects of Embodiment 1 and, furthermore, is efficient in a case where each radar device cooperates with another sensor such as a camera that monitors the same area as that which the radar device irradiates with radar.

Embodiment 4

Figure 12:
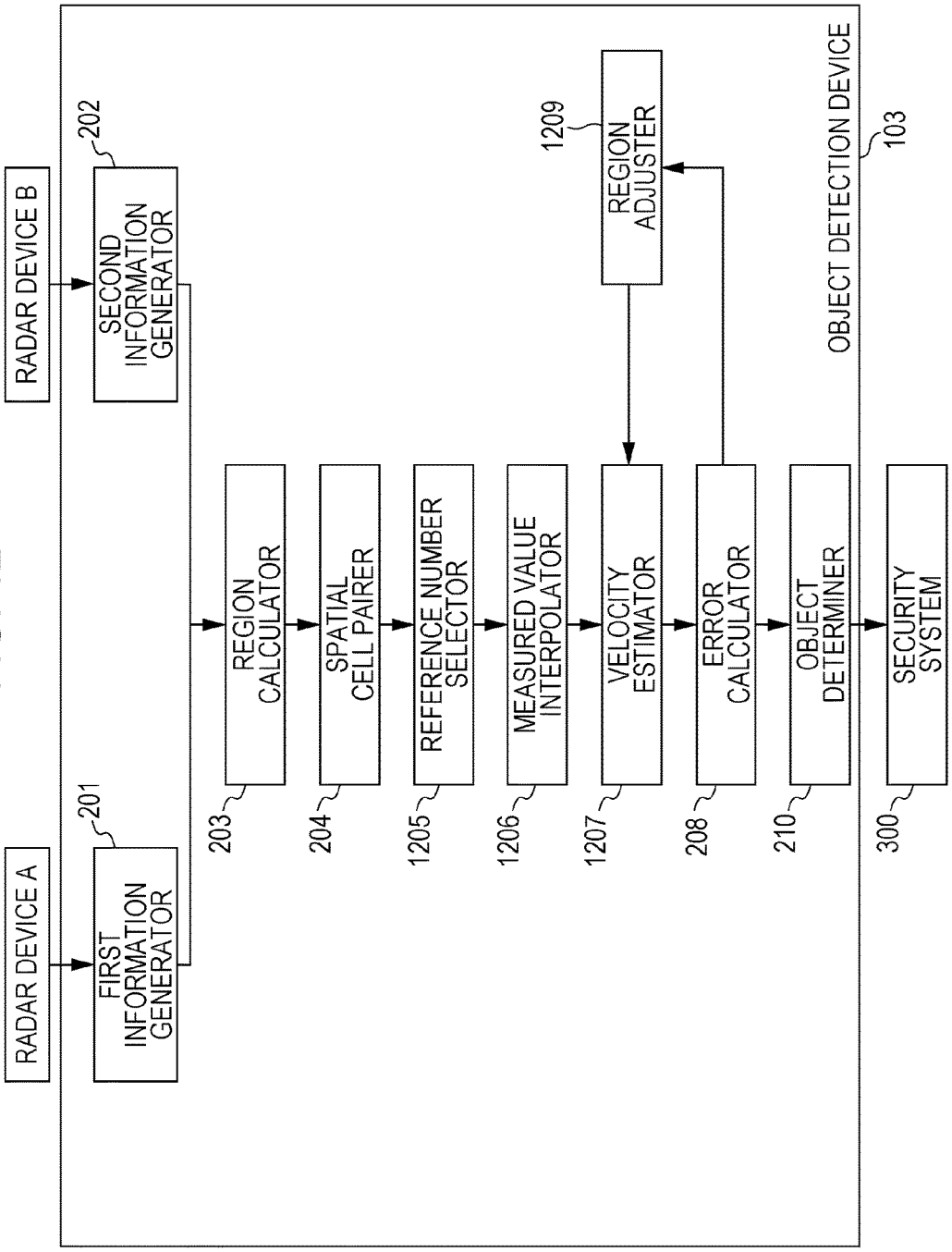
FIG. 12 is a block diagram illustrating main components of an object detection device according to Embodiment 4 of the present disclosure.

Next, an object detection device according to Embodiment 4 of the present disclosure is described with reference to the drawings. FIG. 12 is a block diagram illustrating main components of an object detection device 103 according to Embodiment 4 of the present disclosure. In FIG. 12, components identical to those illustrated in FIG. 2 are given the same signs, and a detailed description thereof is omitted. As illustrated in FIG. 12, the object detection device 103 is configured to include a reference number selector 1205 as an example of a spatial cell selector and to include a measured value interpolator 1206, a velocity estimator 1207, and a region adjuster 1209 in place of the measured value interpolator 206, the velocity estimator 207, and the region adjuster 209 illustrated in FIG. 2, respectively.

On the basis of the pairing information inputted from the spatial cell pairer 204, the reference number selector 1205 compares the number of measured values of spatial cells (e.g., spatial cells a) of the target object region F1 paired with the target object region F2 and the number of measured values of spatial cells (e.g., spatial cells b) of the target object region F2 paired with the target object region F1 and selects the larger number of measured values as a reference number.

Then, the reference number selector 1205 outputs reference number information indicating the selected reference number to the measure value interpolator 1206. The reference number information for example contains a value indicating the target object region from which the reference number was selected (e.g., the target object region F1 or the target object region F2) and the measured values (e.g., distances, azimuths, intensities of reflection, and Doppler values) of the spatial cells of the target object regions paired with each other.

The measured value interpolator 1206 determines a pair of the measured values whose number was selected as the reference number and the interpolated measured values based on the measured values whose number was not selected as the reference number. Then, for example, in a case where the number of measured values of the target object region F1 (spatial cells a) was selected as the reference number, the measured value interpolator 1206 interpolates the interpolated measured values of the spatial cells a on the basis of the actually measured values of the spatial cells b paired with the measured values of the spatial cells a. Alternatively, for example, in a case where the number of measured values of the target object region F2 (spatial cells b) was selected as the reference number, the measured value interpolator 1206 interpolates the interpolated measured values of the spatial cells b on the basis of the actually measured values of the spatial cells a paired with the measured values of the spatial cells b.

As a result of such interpolation, the number of measured values included in the spatial cells a and the number of interpolated measured values for the spatial cells a become equal.

Then, the measured value interpolator 1206 outputs interpolation result information indicating an interpolation result to the velocity estimator 1207.

The velocity estimator 1207 estimates the velocity of the target object on the basis of the pair of the measured values included in the target object region F1 and the interpolated measured values in the target object region F1 or the pair of the measured values included in the target object region F2 and the interpolated measured values in the target object region F2. For example, the velocity estimator 1207 performs weighted summing on the pair of measured values indicated by the interpolation result information and performs regression assuming them as measured values of regression calculation. Specifically, the following mathematical formula (2) is utilized:

$$w_1 \begin{bmatrix} V_{a,1} \\ V_{a,2} \\ \vdots \\ V_{a,N} \end{bmatrix} + w_2 \begin{bmatrix} V_{b,1} \\ V_{b,2} \\ \vdots \\ V_{b,N} \end{bmatrix} = \qquad (2)$$

-continued $$\left( w_1 \begin{bmatrix} \cos(\theta_{a,1}) & \sin(\theta_{a,1}) \\ \cos(\theta_{a,2}) & \sin(\theta_{a,2}) \\ \vdots & \vdots \\ \cos(\theta_{a,N}) & \sin(\theta_{a,N}) \end{bmatrix} + w_2 \begin{bmatrix} \cos(\theta_{b,1}) & \sin(\theta_{b,1}) \\ \cos(\theta_{b,2}) & \sin(\theta_{b,2}) \\ \vdots & \vdots \\ \cos(\theta_{b,N}) & \sin(\theta_{b,N}) \end{bmatrix} \right) \begin{bmatrix} V_x \\ V_y \end{bmatrix}$$

Note, however, that the weight coefficients satisfy the following conditional expression (3):

$$w_1 + w_2 = 1 \qquad (3)$$

Further, in the foregoing mathematical formula (2), Va,i is the measured Doppler value of a spatial cell a and Vb,i is an interpolated Doppler value based on a spatial cell b. Further, in the foregoing mathematical formula (2), θa,i and θb,i are each an azimuth and Vx and Vy are estimated values of the actual velocity.

The velocity estimator 1207 outputs estimation result information indicating results calculated on the basis of the foregoing mathematical formulas (2) and (3) to the error calculator 208.

The region adjuster 1209 adjusts the target object region by excluding a certain number of spatial cells from the spatial cells having large errors on the basis of the error distribution information and estimation result information inputted from the error calculator 208. Note here that, unlike the region adjuster 209 illustrated in FIG. 2, the region adjuster 1209 excludes spatial cells a and b in pairs. Then, the region adjuster 1209 outputs adjustment result information indicating the adjusted target object region to the velocity estimator 1207. The subsequent operation is the same as that of Embodiment 1.

Embodiment 4 of the present disclosure described above can bring about the aforementioned effects of Embodiment 1 and, furthermore, can cope with different degrees of accuracy of radar measurement, as the measured values of the radar devices A and B are adaptively utilized by introducing the weight coefficients $w_1$ and $w_2$ and performing automatic calculations.

Various aspects of embodiments according to the present disclosure encompass the following aspects:

An object detection device according to a first disclosure includes: first information generation circuitry which, in operation, in a plurality of first spatial cells divided from each other in each direction of transmission of a first radar signal that a first radar device transmits and at each first distance from the first radar device, calculates at least one first measured value concerning at least one first reflected signal from a target object which the first radar device receives; second information generation circuitry which, in operation, in a plurality of second spatial cells divided from each other in each direction of transmission of a second radar signal that a second radar device transmits and at each second distance from the second radar device, calculates at least one second measured value concerning at least one second reflected signal from the target object which the second radar device receives; region calculation circuitry which, in operation, based on the first measured value, selects at least one of the plurality of first spatial cells in which the target object is estimated to be present as a first target object region and that, based on the second measured value, selects at least one of the plurality of second spatial cells in which the target object is estimated to be present as a second target object region; measured value interpolation circuitry which, in operation, calculates a first interpolated measured value of the first target object region using the second measured value of the second target object region or calculates a second interpolated measured value of the second target object region using the first measured value of the first target object region; and object determination circuitry which, in operation, determines the target object using a combination of the first measured value and the first interpolated measured value or a combination of the second measured value and the second interpolated measured value.

An object detection device according to a second disclosure is the object detection device of the first disclosure, further including: spatial cell pairing circuitry which, in operation, pairs the first target object region and the second target object region with each other; and spatial cell selection circuitry which, in operation, selects either of the first and second target object regions paired with each other, wherein the spatial cell pairing circuitry selects either of the first and second target object regions paired with each other based on a size of each first spatial cell constituting the first target object region and a size of each second spatial cell constituting the second target object region, and the measured value interpolation circuitry calculates an interpolated measured value for the selected target object region.

An object detection device according to a third disclosure is the object detection device of the second disclosure, further including region division circuitry which, in operation, divides a region in which measurements are performed by the first and second radar devices into a plurality of divided regions according to distances from the first and second radar devices, wherein the spatial cell selection circuitry selects the first target object region in a case where the first and second target object regions paired with each other are located in a first divided region that is closer to the first radar device than to the second radar device, the spatial cell selection circuitry selects the second target object region in a case where the first and second target object regions paired with each other are located in a second divided region that is closer to the second radar device than to the first radar device, the spatial cell selection circuitry selects neither the first target object region nor the second target object region in a case where the first and second target object regions paired with each other are located in a third divided region including a region that is at the same distance from the first and second radar devices, the measured value interpolation circuitry calculates the first interpolated measured value of the first target object region, based on the second measured value of the second target object region in a case where the selected first target object region is inputted, the measured value interpolation circuitry calculates the second interpolated measured value of the second target object region, based on the first measured value of the first target object region in a case where the selected second target object region is inputted, and the measured value interpolation circuitry interpolates neither the first measured value of the first target object region nor the second measured value of the second target object region in a case where neither the first target object region nor the second target object region is inputted.

An object detection device according to a fourth disclosure is the object detection device of the second disclosure, in which the spatial cell selection circuitry compares the number of first measured values included in the first target object region paired with the second target object region and the number of second measured values included in the second target object region paired with the first target object region and selects the larger number of measured values as a reference number, in a case where the number of first measured values is selected as the reference number, the measured value interpolation circuitry determines a pair of the first measured values and the first interpolated measured value and calculates an interpolated measured value in the first target object region using the second measured values paired with the first measured values, and in a case where the number of second measured values is selected as the reference number, the measured value interpolation circuitry determines a pair of the second measured values and the second interpolated measured value and calculates an interpolated measured value in the second target object region using the first measured values paired with the second measured values.

An object detection device according to a fifth disclosure is the object detection device of the fourth disclosure, further including velocity estimation circuitry which, in operation, estimates a velocity of the target object, based on the pair of the first measured values included in the first target object region and the interpolated measured value in the first target object region or the pair of the second measured values included in the second target object region and the interpolated measured value in the second target object region.

An object detection device according to a sixth disclosure is the object detection device of the first disclosure, further including: reference cell setting circuitry which, in operation, sets at least one reference cell in a part of a region in which measurements to be performed by the first and second radar devices; and measured value conversion circuitry which, in operation, associates the first measured value of at least one of the first spatial cells which corresponds to the reference cell and the second measured value of at least one of the second spatial cells which corresponds to the reference cell with at least one the reference cell, wherein at least one of the plurality of first spatial cells in which the target object is estimated to be present is selected as the first target object region, based on the first measured value associated with the reference cell, and at least one of the plurality of second spatial cells in which the target object is estimated to be present is selected as the second target object region, based on the second measured value associated with the reference cell.

An object detection device according to a seventh disclosure is the object detection device of the first disclosure, in which the object determination circuitry determines at least one of a position, shape, size, and type of the target object.

An object detection device according to an eighth disclosure is the object detection device of the fifth disclosure, further including: error calculation circuitry which, in operation, calculates an error between the first measured value and the first interpolated measured value or an error between the second measured value and the second interpolated measured value, based on a velocity of the target object as estimated by the velocity estimation circuitry; and region adjustment circuitry which, in operation, reselects, based on the calculated error, at least one spatial cell constituting the selected first target object region or the selected second target object region, wherein the velocity estimation circuitry again estimates the velocity of the target object, based on the measured value of the reselected spatial cell and either the interpolated measured value or a regressionally-computed interpolated measured value.

An object detection device according to a ninth disclosure is the object detection device of the first disclosure, in which the first measured value includes first power profile information indicating an intensity of reflection of a radar signal received by the first radar device and first Doppler profile information indicating a Doppler value of the radar signal received by the first radar device, and the second measured value includes second power profile information indicating an intensity of reflection of a radar signal received by the second radar device and second Doppler profile information indicating a Doppler value of the radar signal received by the second radar device.

An object detection method according to a tenth disclosure includes: calculating, in a plurality of first spatial cells divided from each other in each direction of transmission of a first radar signal that a first radar device transmits and at each first distance from the first radar device, at least one first measured value concerning at least one first reflected signal from a target object which the first radar device receives; calculating, in a plurality of second spatial cells divided from each other in each direction of transmission of a second radar signal that a second radar device transmits and at each second distance from the second radar device, at least one second measured value concerning at least one second reflected signal from the target object which the second radar device receives; selecting at least one of the plurality of first spatial cells in which the target object is estimated to be present based on the first measured value as a first target object region; selecting at least one of the plurality of second spatial cells in which the target object is estimated to be present based on the second measured value as a second target object region; calculating a first interpolated measured value of the first target object region using the second measured value of the second target object region or calculating a second interpolated measured value of the second target object region using the first measured value of the first target object region; and determining the target object using a combination of the first measured value and the first interpolated measured value or a combination of the second measured value and the second interpolated measured value.

An object detection method according to an eleventh disclosure is the object detection method according to the tenth disclosure, further including: pairing the first target object region and the second target object region with each other; and selecting either of the first and second target object regions paired with each other based on a size of each first spatial cell constituting the first target object region and a size of each second spatial cell constituting the second target object region.

An object detection method according to a twelfth disclosure is the object detection method according to the tenth disclosure, further including determining at least one of a position, shape, size, and type of the target object.

An object detection method according to a thirteenth disclosure is the object detection method according to the tenth disclosure, further including: calculating an error between the first measured value and the first interpolated measured value or an error between the second measured value and the second interpolated measured value, based on an estimated velocity of the target object; reselecting, based on the error thus calculated, at least one spatial cell constituting the selected first target object region or the selected second target object region; and again estimating the velocity of the target object, based on the measured value of the reselected spatial cell and either the interpolated measured value or a regressionally-computed interpolated measured value.

Although each of the above embodiments has been described by taking as an example a case where the present disclosure is constituted by hardware, the present disclosure can also be achieved by software.

Further, the technique of circuit integration is not limited to LSI, but may be achieved by a dedicated circuit or a general-purpose processor. After LSI manufacturing, a programmable FPGA (field programmable gate array) or a reconfigurable processor capable of reconfiguring the connections and settings for circuit cells inside the LSI may be utilized.

Furthermore, if advances in semiconductor technology or other technologies derived therefrom give way to the emergence of a technology of circuit integration that replaces LSI, the functional blocks may of course be integrated using the technology. Adoption of biotechnology or the like can be a possibility.

An object detection device and an object detection method according to the present disclosure are suitably used in a roadway infrastructure system. When used in an infrastructure system, the object detection device and the object detection method can achieve traffic management and traffic accident avoidance by detecting a pedestrian, a two-wheel vehicle, a vehicle, or the like, monitoring traffic conditions, controlling the infrastructure system, and conveying information to the drivers of vehicles.

What is claimed is:

1. An object detection device comprising:
    first information generation circuitry which, in operation, in a plurality of first spatial cells divided from each other in each direction of transmission of a first radar signal that a first radar device transmits and at each first distance from the first radar device, calculates at least one first measured value concerning at least one first reflected signal from a target object which the first radar device receives;
    second information generation circuitry which, in operation, in a plurality of second spatial cells divided from each other in each direction of transmission of a second radar signal that a second radar device transmits and at each second distance from the second radar device, calculates at least one second measured value concerning at least one second reflected signal from the target object which the second radar device receives;
    region calculation circuitry which, in operation, based on the first measured value, selects at least one of the plurality of first spatial cells in which the target object is estimated to be present as a first target object region and that, based on the second measured value, selects at least one of the plurality of second spatial cells in which the target object is estimated to be present as a second target object region;
    measured value interpolation circuitry which, in operation, calculates a first interpolated measured value of the first target object region using the second measured value of the second target object region or calculates a second interpolated measured value of the second target object region using the first measured value of the first target object region; and
    object determination circuitry which, in operation, determines the target object using a combination of the first measured value and the first interpolated measured value or a combination of the second measured value and the second interpolated measured value.

2. The object detection device according to claim 1, further comprising:
    spatial cell pairing circuitry which, in operation, pairs the first target object region and the second target object region with each other; and
    spatial cell selection circuitry which, in operation, selects either of the first and second target object regions paired with each other,
    wherein the spatial cell pairing circuitry selects either of the first and second target object regions paired with each other based on a size of each first spatial cell constituting the first target object region and a size of each second spatial cell constituting the second target object region, and the measured value interpolation circuitry calculates an interpolated measured value for the selected target object region.

3. The object detection device according to claim 2, further comprising region division circuitry which, in operation, divides a region in which measurements are performed by the first and second radar devices into a plurality of divided regions according to distances from the first and second radar devices, wherein the spatial cell selection circuitry selects the first target object region in a case where the first and second target object regions paired with each other are located in a first divided region that is closer to the first radar device than to the second radar device, the spatial cell selection circuitry selects the second target object region in a case where the first and second target object regions paired with each other are located in a second divided region that is closer to the second radar device than to the first radar device, the spatial cell selection circuitry selects neither the first target object region nor the second target object region in a case where the first and second target object regions paired with each other are located in a third divided region including a region that is at the same distance from the first and second radar devices, the measured value interpolation circuitry calculates the first interpolated measured value of the first target object region, based on the second measured value of the second target object region in a case where the selected first target object region is inputted, the measured value interpolation circuitry calculates the second interpolated measured value of the second target object region, based on the first measured value of the first target object region in a case where the selected second target object region is inputted, and the measured value interpolation circuitry interpolates neither the first measured value of the first target object region nor the second measured value of the second target object region in a case where neither the first target object region nor the second target object region is inputted.

4. The object detection device according to claim 2, wherein the spatial cell selection circuitry compares the number of first measured values included in the first target object region paired with the second target object region and the number of second measured values included in the second target object region paired with the first target object region and selects the larger number of measured values as a reference number, in a case where the number of first measured values is selected as the reference number, the measured value interpolation circuitry determines a pair of the first measured values and the first interpolated measured value and calculates an interpolated measured value in the first target object region using the second measured values paired with the first measured values, and in a case where the number of second measured values is selected as the reference number, the measured value interpolation circuitry determines a pair of the second measured values and the second interpolated measured value and calculates an interpolated measured value in the second target object region using the first measured values paired with the second measured values.

5. The object detection device according to claim 4, further comprising velocity estimation circuitry which, in operation, estimates a velocity of the target object, based on the pair of the first measured values included in the first target object region and the interpolated measured value in the first target object region or the pair of the second measured values included in the second target object region and the interpolated measured value in the second target object region.

6. The object detection device according to claim 1, wherein the region calculator includes:

reference cell setting circuitry which, in operation, sets at least one reference cell in a part of a region in which measurements to be performed by the first and second radar devices; and measured value conversion circuitry which, in operation, associates the first measured value of at least one of the first spatial cells which corresponds to the reference cell and the second measured value of at least one of the second spatial cells which corresponds to the reference cell with at least one the reference cell, wherein at least one of the plurality of first spatial cells in which the target object is estimated to be present is selected as the first target object region, based on the first measured value associated with the reference cell, and at least one of the plurality of second spatial cells in which the target object is estimated to be present is selected as the second target object region, based on the second measured value associated with the reference cell.

7. The object detection device according to claim 1, wherein the object determination circuitry determines at least one of a position, shape, size, and type of the target object.

8. The object detection device according to claim 5, further comprising:

error calculation circuitry which, in operation, calculates an error between the first measured value and the first interpolated measured value or an error between the second measured value and the second interpolated measured value, based on a velocity of the target object as estimated by the velocity estimation circuitry; and region adjustment circuitry which, in operation, reselects, based on the calculated error, at least one spatial cell constituting the selected first target object region or the selected second target object region, wherein the velocity estimation circuitry again estimates the velocity of the target object, based on the measured value of the reselected spatial cell and either the interpolated measured value or a regressionally-computed interpolated measured value.

9. The object detection device according to claim 1, wherein the first measured value includes first power profile information indicating an intensity of reflection of a radar signal received by the first radar device and first Doppler profile information indicating a Doppler value of the radar signal received by the first radar device, and the second measured value includes second power profile information indicating an intensity of reflection of a radar signal received by the second radar device and second Doppler profile information indicating a Doppler value of the radar signal received by the second radar device.

10. An object detection method comprising:

calculating, in a plurality of first spatial cells divided from each other in each direction of transmission of a first radar signal that a first radar device transmits and at each first distance from the first radar device, at least one first measured value concerning at least one first reflected signal from a target object which the first radar device receives;

calculating, in a plurality of second spatial cells divided from each other in each direction of transmission of a second radar signal that a second radar device transmits and at each second distance from the second radar device, at least one second measured value concerning at least one second reflected signal from the target object which the second radar device receives;

selecting at least one of the plurality of first spatial cells in which the target object is estimated to be present based on the first measured value as a first target object region;

selecting at least one of the plurality of second spatial cells in which the target object is estimated to be present based on the second measured value as a second target object region;

calculating a first interpolated measured value of the first target object region using the second measured value of the second target object region or calculating a second interpolated measured value of the second target object region using the first measured value of the first target object region; and determining the target object using a combination of the first measured value and the first interpolated measured value or a combination of the second measured value and the second interpolated measured value.

11. The object detection method according to claim 10, further comprising:

pairing the first target object region and the second target object region with each other; and selecting either of the first and second target object regions paired with each other based on a size of each first spatial cell constituting the first target object region and a size of each second spatial cell constituting the second target object region.

12. The object detection method according to claim 10, further comprising determining at least one of a position, shape, size, and type of the target object.

13. The object detection method according to claim 10, further comprising:

calculating an error between the first measured value and the first interpolated measured value or an error between the second measured value and the second interpolated measured value, based on an estimated velocity of the target object;

reselecting, based on the error thus calculated, at least one spatial cell constituting the selected first target object region or the selected second target object region; and again estimating the velocity of the target object, based on the measured value of the reselected spatial cell and either the interpolated measured value or a regressionally-computed interpolated measured value.

* * * * *